US010810482B2

(12) United States Patent
Kim et al.

(10) Patent No.: US 10,810,482 B2
(45) Date of Patent: Oct. 20, 2020

(54) SYSTEM AND METHOD FOR RESIDUAL LONG SHORT TERM MEMORIES (LSTM) NETWORK

(71) Applicant: Samsung Electronics Co., Ltd., Gyeonggi-do (KR)

(72) Inventors: JaeYoung Kim, San Diego, CA (US); Jungwon Lee, San Diego, CA (US); Mostafa El-Khamy, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 861 days.

(21) Appl. No.: 15/343,987

(22) Filed: Nov. 4, 2016

(65) Prior Publication Data

US 2018/0060721 A1    Mar. 1, 2018

Related U.S. Application Data

(60) Provisional application No. 62/381,310, filed on Aug. 30, 2016.

(51) Int. Cl.
*G06N 3/04* (2006.01)
*G06N 3/08* (2006.01)

(52) U.S. Cl.
CPC ............ *G06N 3/04* (2013.01); *G06N 3/0445* (2013.01); *G06N 3/08* (2013.01)

(58) Field of Classification Search
CPC ........... G06N 3/04; G06N 3/0445; G06N 3/08
See application file for complete search history.

(56) References Cited

U.S. PATENT DOCUMENTS

| 9,292,787 | B2 | 3/2016 | Yu et al. |
| 9,620,108 | B2* | 4/2017 | Sak ......................... G10L 15/02 |
| 2003/0088529 | A1* | 5/2003 | Klinker ................... H04L 45/00 |
| | | | 706/3 |
| 2007/0011639 | A1* | 1/2007 | Pitts .................... G06F 17/5072 |
| | | | 716/52 |

(Continued)

FOREIGN PATENT DOCUMENTS

EP            3153998 A2 *    4/2017    ............. G06N 3/063

OTHER PUBLICATIONS

Cheng Wang, Haojin Yang, Christian Bartz, and Christoph Meinel. 2016. Image Captioning with Deep Bidirectional LSTMs. In Proceedings of the 24th ACM international conference on Multimedia (MM '16). ACM, New York, NY, USA, 988-997. DOI: https://doi.org/10.1145/2964284.2964299 (Year: 2016).*

(Continued)

*Primary Examiner* — Eric Nilsson
*Assistant Examiner* — Ahsif A. Sheikh
(74) *Attorney, Agent, or Firm* — The Farrell Law Firm, P.C.

(57) ABSTRACT

An apparatus and a method. The apparatus includes a plurality of long short term memory (LSTM) networks, wherein each of the plurality of LSTM networks is at a different network layer, wherein each of the plurality of LSTM networks is configured to determine a residual function, wherein each of the plurality of LSTM networks includes an output gate to control what is provided to a subsequent LSTM network, and wherein each of the plurality of LSTM networks includes at least one highway connection to compensate for the residual function of a previous LSTM network.

20 Claims, 8 Drawing Sheets

(56) References Cited

U.S. PATENT DOCUMENTS

| | | |
|---|---|---|
| 2015/0340034 A1 | 11/2015 | Schalkwyk et al. |
| 2016/0063359 A1 | 3/2016 | Szegedy et al. |
| 2016/0078339 A1 | 3/2016 | Li et al. |
| 2016/0086600 A1 | 3/2016 | Bauer et al. |
| 2016/0098632 A1 | 4/2016 | Sutskever et al. |
| 2016/0111108 A1 | 4/2016 | Erdogan et al. |
| 2016/0162781 A1 | 6/2016 | Lillicrap et al. |
| 2016/0171974 A1 | 6/2016 | Hannun et al. |
| 2019/0034416 A1* | 1/2019 | Al Hasan ............ G06F 17/2785 |

OTHER PUBLICATIONS

Brendan Jou and Shih-Fu Chang. 2016. Deep Cross Residual Learning for Multitask Visual Recognition. In Proceedings of the 24th ACM international conference on Multimedia (MM '16). ACM, New York, NY, USA, 998-1007. DOI: https://doi.org/10.1145/2964284.2964309 (Year: 2016).*

Cheng Wang, Haojin Yang, Christian Bartz, and Christoph Meinel. 2016. Image Captioning with Deep Bidirectional LSTMs. In Proceedings of the 24th ACM international conference on Multimedia (MM '16). ACM, New York, NY, USA, 988-997. DOI: https://doi.org/10.1145/2964284.2964299 (Year: 2016).*

Zhang, Yu & Chen, Guoguo & Yu, Dong & Yao, Kaisheng & Khudanpur, Sanjeev & Glass, James. (2015). Highway Long Short-Term Memory RNNs for Distant Speech Recognition. (Year: 2015).*

Prabhavalkar, Rohit, et al. "On the compression of recurrent neural networks with an application to LVCSR acoustic modeling for embedded speech recognition." 2016 IEEE International Conference on Acoustics, Speech and Signal Processing (ICASSP). IEEE, 2016. (Year: 2016).*

* cited by examiner

DETERMINE $h_t^{L+1}$ IN THE LSTM NETWORK AS
$o_t^{L+1} \odot W_{proj}^{L+1} \tanh(c_t^{L+1}) + (1-o_t^{L+1}) \odot W_h^{L+1} x_t^{L+1}$ —811

DETERMINE $h_t^{L+1}$ IN THE LSTM NETWORK
AS $o_t^{L+1} \odot W_{proj}^{L+1} \tanh(c_t^{L+1}) + (1-o_t^{L+1}) \odot \sum_{i=1}^{N} (W_{h,i}^{L+1} h_t^{L+1-i})$ —811

DETERMINE $h_t^{L+1}$ IN THE LSTM NETWORK
AS $o_t^{L+1} \odot (W_{proj}^{L+1} \tanh(c_t^{L+1}) + W_h^{L+1} x_t^{L+1})$ —811

FIG. 11

DETERMINE $h_t^{L+1}$ IN THE LSTM NETWORK
AS $o_t^{L+1} \odot (W_{proj}^{L+1} \tanh(c_t^{L+1}) + \sum_{i=1}^{N} (W_{h,i}^{L+1} h_t^{L+1-i}))$ —811

FIG. 12

DETERMINE $h_t^{L+1}$ IN THE LSTM NETWORK
AS $W_{proj}^{L+1} (o_t^{L+1} \odot (\tanh(c_t^{L+1}))) + W_h^{L+1} x_t^{L+1}$ —811

FIG. 13

SYSTEM AND METHOD FOR RESIDUAL LONG SHORT TERM MEMORIES (LSTM) NETWORK

PRIORITY

This application claims priority under 35 U.S.C. § 119(e) to a U.S. Provisional patent application filed on Aug. 30, 2016 in the United States Patent and Trademark Office and assigned Ser. No. 62/381,310, the entire contents of which are incorporated herein by reference.

FIELD

The present disclosure relates generally to a system and a method for a recurrent neural network, and more particularly, to a system and a method for a residual LSTM network.

BACKGROUND

A deep learning method is a type of machine learning method based on learning representations of data by using a deep graph with multiple processing layers. Such deep learning architectures include deep neural networks. A deep neural network (DNN) provides various functions such as image classification, speech recognition, and natural language processing. For example, Google's ALPHAGO™, a computer program for playing the board game "Go," based on a deep convolutional neural network (deep CNN or DCNN), recently defeated the human world champion of "Go," which suggests that complex tasks which were considered to be performed only by human beings can be solved by deep neural networks.

The depth of a neural network represents the number of successive layers in feedforward networks. A deeper neural network can better represent an input feature with lower complexity as compared to a shallow neural network. However, training deep networks is difficult due to vanishing/exploding gradient problems, and existing optimization solvers often fail with an increasing number of layers. Furthermore, the increasing depth of recurrent architectures like a gated recurrent unit (GRU) and long short term memories (LSTM) makes training of recurrent neural network (RNN) architectures more difficult because these architectures already have very deep representations in a temporal domain that may further aggravate vanishing/exploding gradient issues.

SUMMARY

According to one embodiment, an apparatus includes a plurality of long short term memory (LSTM) networks, wherein each of the plurality of LSTM networks is at a different network layer, wherein each of the plurality of LSTM networks is configured to determine a residual function, wherein each of the plurality of LSTM networks includes an output gate to control what is provided to a subsequent LSTM network, and wherein each of the plurality of LSTM networks includes at least one highway connection to compensate for the residual function of a previous LSTM network.

According to one embodiment, a method includes configuring a plurality of long short term memory (LSTM) networks, wherein each of the plurality of LSTM networks is at a different network layer; determining a residual function for each of the plurality of LSTM networks; controlling, by an output gate of each of the plurality of LSTM networks, what is provided to a subsequent LSTM network, and compensating, by at least one highway connection of each of the plurality of LSTM networks, for the residual function of a previous LSTM network.

According to one embodiment, a method of manufacturing a residual long short time memory (LSTM) network including forming the residual LSTM network on a wafer or a package with at least one other residual LSTM network, wherein the residual network is configured to determine by a first function block $f_t^{L+1} = \text{sigm}(W_{xf}^{L+1} x_t^{L+1} + W_{hf}^{L+1} h_{t-1}^{L+1} + W_{cf}^{L+1} \odot c_{t-1}^{L+1} + b_f^{L+1})$; determine by a second function block $i_t^{L+1} = \text{sigm}(W_{xi}^{L+1} x_t^{L+1} + W_{hi}^{L+1} h_{t-1}^{L+1} + W_{ci}^{L+1} \odot c_{t-1}^{L+1} + b_i^{L+1})$; determine a third function block $j_t^{L+1} = \tanh(W_{xc}^{L+1} x_t^{L+1} + W_{hc}^{L+1} h_{t-1}^{L+1} + b_j^{L+1})$; determine by a fourth function block $o_t^{L+1} = \text{sigm}(W_{xo}^{L+1} x_t^{L+1} + W_{ho}^{L+1} h_{t-1}^{L+1} + W_{co}^{L+1} c_t^{L+1} + b_o^{L+1})$; determine by a fifth function block $c_t^{L+1} = f_t^{L+1} \odot c_{t-1}^{L+1} + i_t^{L+1} \odot j_t^{L+1}$; and determine by a sixth function block $h_t^{L+1}$ as a function of $c_t^{L+1}$, $o_t^{L+1}$, and one of $x_t^{L+1}$ or $$\sum_{i=1}^{N} W_{h,i}^{L+1} h_t^{L+1-i},$$

wherein $x_t^{L+1}$ is an input to the LSTM network, $h_{t-1}^{L+1}$ is an output of a previous time in the LSTM network, $c_{t-1}^{L+1}$ is a cell activation of the previous time in the LSTM network, $W_{xf}^{L+1}$, $W_{hf}^{L+1}$, $W_{cf}^{L+1}$, $W_{xi}^{L+1}$, $W_{hi}^{L+1}$, $W_{ci}^{L+1}$, $W_{xc}^{L+1}$, $W_{hc}^{L+1}$, $W_{xo}^{L+1}$, $W_{ho}^{L+1}$, and $W_{co}^{L+1}$ are weight matrices of the LSTM network, and $b_f^{L+1}$, $b_i^{L+1}$, $b_j^{L+1}$, $b_o^{L+1}$ are predetermined bias values of the LSTM network; and testing the hybrid recurrent network with the highway connection, wherein testing the hybrid recurrent network with the highway connection comprises testing the hybrid recurrent network with the highway connection and the at least one other hybrid recurrent network with the highway connection using one or more electrical to optical converters, one or more optical splitters that split an optical signal into two or more optical signals, and one or more optical to electrical converters.

According to one embodiment, a method of constructing an integrated circuit includes generating a mask layout for a set of features for a layer of the integrated circuit, wherein the mask layout includes standard cell library macros for one or more circuit features that include an LSTM network on a wafer or a package with at least one other residual LSTM network, wherein the residual network is configured to determine by a first function block $f_t^{L+1} = \text{sigm}(W_{xf}^{L+1} x_t^{L+1} + W_{hf}^{L+1} h_{t-1}^{L+1} + W_{cf}^{L+1} \odot c_{t-1}^{L+1} + b_f^{L+1})$; determine by a second function block $i_t^{L+1} = \text{sigm}(W_{xi}^{L+1} x_t^{L+1} + W_{hi}^{L+1} h_{t-1}^{L+1} + W_{ci}^{L+1} \odot c_{t-1}^{L+1} + b_i^{L+1})$; determine by a third function block $j_t^{L+1} = \tanh(W_{xc}^{L+1} x_t^{L+1} + W_{hc}^{L+1} h_{t-1}^{L+1} + b_j^{L+1})$; determine by a fourth function block $o_t^{L+1} = \text{sigm}(W_{xo}^{L+1} x_t^{L+1} + W_{ho}^{L+1} h_{t-1}^{L+1} + W_{co}^{L+1} c_t^{L+1} + b_o^{L+1})$; determine by a fifth function block $c_t^{L+1} = f_t^{L+1} \odot c_{t-1}^{L+1} + i_t^{L+1} \odot j_t^{L+1}$; and determine by a sixth function block $h_t^{L+1}$ as a function of $c_t^{L+1}$, $o_t^{L+1}$, and one of $x_t^{L+1}$ or $$\sum_{i=1}^{N} W_{h,i}^{L+1} h_t^{L+1-i},$$

wherein $x_t^{L+1}$ is an input to the LSTM network; $h_{t-1}^{L+1}$ is an output of a previous time in the LSTM network, $c_{t-1}^{L+1}$ is a cell activation of the previous time in the LSTM network, $W_{xf}^{L+1}$, $W_{hf}^{L+1}$, $W_{cf}^{L+1}$, $W_{xi}^{L+1}$, $W_{hi}^{L+1}$, $W_{ci}^{L+1}$, $W_{xc}^{L+1}$, $W_{hc}^{L+1}$, $W_{xo}^{L+1}$, $W_{ho}^{L+1}$, and $W_{co}^{L+1}$ are weight matrices of the LSTM network, and $b_f^{L+1}$, $b_i^{L+1}$, $b_j^{L+1}$, $b_o^{L+1}$ are predetermined bias values of the LSTM network; disregarding relative positions of the macros for compliance to layout design rules during the generation of the mask layout; checking the relative positions of the macros for compliance to layout design rules after generating the mask layout; upon detection of noncompliance with the layout design rules by any of the macros, modifying the mask layout by modifying each of the noncompliant macros to comply with the layout design rules; generating a mask according to the modified mask layout with the set of features for the layer of the integrated circuit; and manufacturing the integrated circuit layer according to the mask.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 11 is a flowchart of an $h_t^{L+1}$ step of FIG. 8 for using a projection matrix to control a highway connection, according to an embodiment of the present disclosure;

FIG. 12 is a flowchart of an $h_t^{L+1}$ step of FIG. 8 for using a projection matrix to control multiple highway connections, according to an embodiment of the present disclosure;

FIG. 13 is a flowchart of an $h_t^{L+1}$ step of FIG. 8 for linearly adding all prior layers to control a highway connection, according to an embodiment of the present disclosure;

DETAILED DESCRIPTION OF EMBODIMENTS OF THE PRESENT DISCLOSURE

Figure 1A:
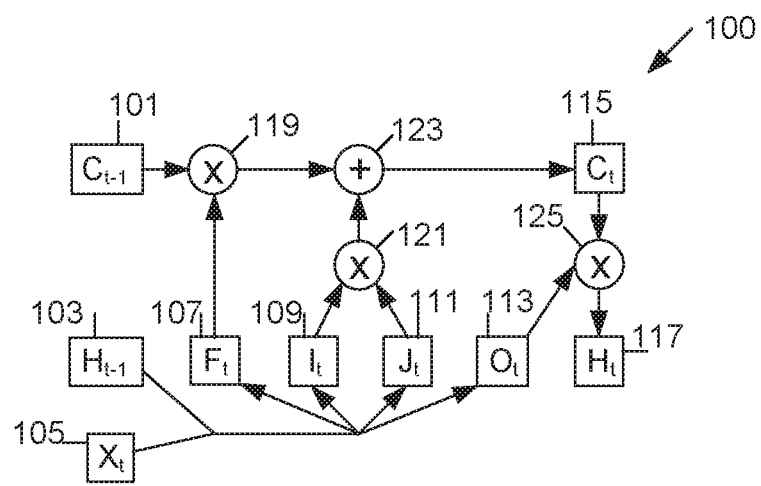
FIG. 1A is a block diagram of a simplified version of an network architecture.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

The present disclosure is related to a system and method for a residual LSTM network. An embodiment of the present disclosure overcomes gradient vanishing/explosion issues on recurrent and hybrid neural networks. The present disclosure provides information flow in deep LSTM networks.

According to one embodiment, the present disclosure provides a highway connection between an input and an output of LSTM layers directly (not internal memory). Each LSTM layer output attempts to learn residual mapping that is not learnable from a previous layer. An output gate network of an LSTM network may be reused for a gate network for a highway connection as well. The present disclosure does not require extra gate networks for a highway connection.

According to one embodiment, an output of an RNN may be described in Equation (1) as follows:

$$h_t = g(W_{hh}h_{t-1} + W_{xh}x_t) \quad (1)$$

where g is a non linear function, $x_t$ is an input, and $W_{hh}$ and $W_{xh}$ are weight matrices.

FIG. 1 is a block diagram of a simplified version of an LSTM network architecture 100.

Referring to FIG. 1, the simplified version LSTM network architecture 100 in a layer (e.g., layer L+1) includes a first cell activation register $c_{t-1}^{L+1}$ 101 to hold the cell activation of a previous time, a first output gate $h_{t-1}^{L+1}$ 103 to hold the output of a previous time, an input register $x_t^{L+1}$ 105, a forget gate $f_t^{L+1}$ 107, an input gate $i_t^{L+1}$ 109, a new input register $j_t^{L+1}$ 111, a cell output activation register $o_t^{L+1}$ 113, a second cell activation register $c_t^{L+1}$ 115, and a second output gate $h_t^{L+1}$ 117.

The first cell activation register $c_{t-1}^{L+1}$ 101 includes an output connected to a first input of a component-wise multiplication gate 119, where the first component-wise multiplication gate 119 includes a second input and an output. The first output gate $h_{t-1}^{L+1}$ 103 includes an output connected to an input of each of the forget $f_t^{L+1}$ 107, the input gate $i_t^{L+1}$ 109, the new input register $j_t^{L+1}$ 111, and the cell output activation register $o_t^{L+1}$ 113. The input register $x_t^{L+1}$ 105 includes an output connected to the inputs of each of the forget gate $f_t^{L+1}$ 107, the input gate $i_t^{L+1}$ 109, the new input register $j_t^{L+1}$ 111, and the cell output activation register $o_t^{L+1}$ 113. The forget gate $f_t^{L+1}$ 107 includes an output connected to the second input of the first component-wise multiplication gate 119, where an input value may any suitable value type (e.g., an integer, a floating point value, etc.). The input gate $i_t^{L+1}$ 109 includes an output connected to a first input of a second component-wise multiplication gate 121, where the second component-wise multiplication gate 121 includes a second input and an output. The new input register $j_t^{L+1}$ 111 includes an output connected to the second input of the second component-wise multiplication gate 121. The cell output activation register $o_t^{L+1}$ 113 includes an output connected to a first input of a third component-wise multiplication gate 125, where the third component-wise multiplication gate includes a second input and an output. A bit-wise adder 123 includes a first input connected to the output of the first component-wise multiplication gate 119, a second input connected to the output of the second component-wise multiplication gate 121, and an output. The second cell activation register $c_t^{L+1}$ 115 includes an input connected to the output of the bit-wise adder 123 and an output connected to the second input of the component-wise multiplication gate 125. The second output gate $h_t^{L+1}$ 117 includes an input connected to the output of the third component-wise multiplication gate 125 and an output.

The forget gate $f_t^{L+1}$ 107, the input gate $i_t^{L+1}$ 109, the new input $j_t^{L+1}$ 111, the cell output activation $o_t^{L+1}$ 113, the cell activation $c_t^{L+1}$ 115, and the output gate $h_t^{L+1}$ 117, which may each be represented in Equations (2)-(7) as follows:

$$i_t^{L+1} = \tanh(W_{xi}^{L+1}x_t^{L+1} + W_{hi}^{L+1}h_{t-1}^{L+1} + b_i^{L+1}) \quad (2)$$

$$f_t^{L+1} = \text{sigm}(W_{xf}^{L+1}x_t^{L+1} + W_{hf}^{L+1}h_{t-1}^{L+1} + b_f^{L+1}) \quad (3)$$

$$j_t^{L+1} = \text{sigm}(W_{xc}^{L+1}x_t^{L+1} + W_{hc}^{L+1}h_{t-1}^{L+1} + b_j^{L+1}) \quad (4)$$

$$c_t^{L+1} = f_t^{L+1} \odot c_{t-1}^{L+1} + i_t^{L+1} \odot j_t^{L+1} \quad (5)$$

$$o_t^{L+1} = \tanh(W_{xo}^{L+1}x_t^{L+1} + W_{ho}^{L+1}h_{t-1}^{L+1} + b_o^{L+1}) \quad (6)$$

$$h_t^{L+1} = o_t^{L+1} \odot \tanh(c_t^{L+1}), \quad (7)$$

where $b_f^{L+1}$, $b_i^{L+1}$, $b_j^{L+1}$, $b_o^{L+1}$ are predetermined bias values, where sigm is a sigmoid function, and where tanh is a hyperbolic tangent function.

The input gate $i_t^{L+1}$ 109 controls how much information from the new input $j_t^{L+1}$ 111 is read. The forget gate $f_t^{L+1}$ 107 controls how much information from the first cell activation register $c_{t-1}^{L+1}$ 101 is forgotten. The projection layers may be neglected or added.

According to one embodiment, the LSTM network architecture with no highway connection and gates do not depend on an internal memory value c, and sigm and tanh may be interchanged as in Equations (8)-(13) as follows:

$$f_t^{L+1} = \text{sigm}(W_{xf}^{L+1}x_t^{L+1} + W_{hf}^{L+1}h_{t-1}^{L+1} + W_{cf}^{L+1}c_{t-1}^{L+1} + b_f^{L+1}) \quad (8)$$

$$i_t^{L+1} = \text{sigm}(W_{xi}^{L+1}x_t^{L+1} + W_{hi}^{L+1}h_{t-1}^{L+1} + W_{ci}^{L+1}c_{t-1}^{L+1} + b_i^{L+1}) \quad (9)$$

$$j_t^{L+1} = \tanh(W_{xc}^{L+1}x_t^{L+1} + W_{hc}^{L+1}h_{t-1}^{L+1} + b_j^{L+1}) \quad (10)$$

$$o_t^{L+1} = \text{sigm}(W_{xo}^{L+1}x_t^{L+1} + W_{ho}^{L+1}h_{t-1}^{L+1} + W_{co}^{L+1}c_t^{L+1} + b_o^{L+1}) \quad (11)$$

$$c_t^{L+1} = f_t^{L+1} \odot c_{t-1}^{L+1} + i_t^{L+1} \odot j_t^{L+1} \quad (12)$$

$$h_t^{L+1} = o_t^{L+1} \odot \tanh(c_t^{L+1}). \quad (13)$$

Stacked LSTM layers may be considered as in Equation (14) as follows:

$$x_t^{L+1} = h_t^L. \quad (14)$$

A highway, or depth, gate $d_t^{L+1}$ connects a first memory cell in a lower layer L with a second memory cell in an upper layer L+1, and controls information that may flow directly as in Equations (15)-17) as follows:

$$x_t^{L+1} = h_t^L \quad (15)$$

$$d_t^{L+1} = s(b_d^{L+1} + W_{xd}^{L+1}x_t^{L+1} + w_{cd}^{L+1} \odot c_{t-1}^{L+1} + w_{ld}^{L+1} \odot c_t^L) \quad (16)$$

$$c_t^{L+1} = d_t^{L+1} \odot c_t^L + f_t^{L+1} \odot c_{t-1}^{L+1} + i_t^{L+1} \odot j_t^{L+1}. \quad (17)$$

where s is a non-linear function.

A highway LSTM may include an internal memory c for a highway connection. However, an internal memory c is not a true LSTM output. Since a highway network facilitates gradient passing layer by layer in order to avoid gradient vanishing/explosion, a highway path on an LSTM output may be included.

According to one embodiment, a network may use an LSTM output for a highway connection. The network learns a residual function that is later compensated through a shortcut connection. Residual mapping is easier to learn than non-residual mapping at increased depth, and, thus, provides better accuracy. A shortcut connection with identity mapping achieves a simpler mapping of previous outputs by driving weights of extra deep layer mappings to zero.

Figure 1B:
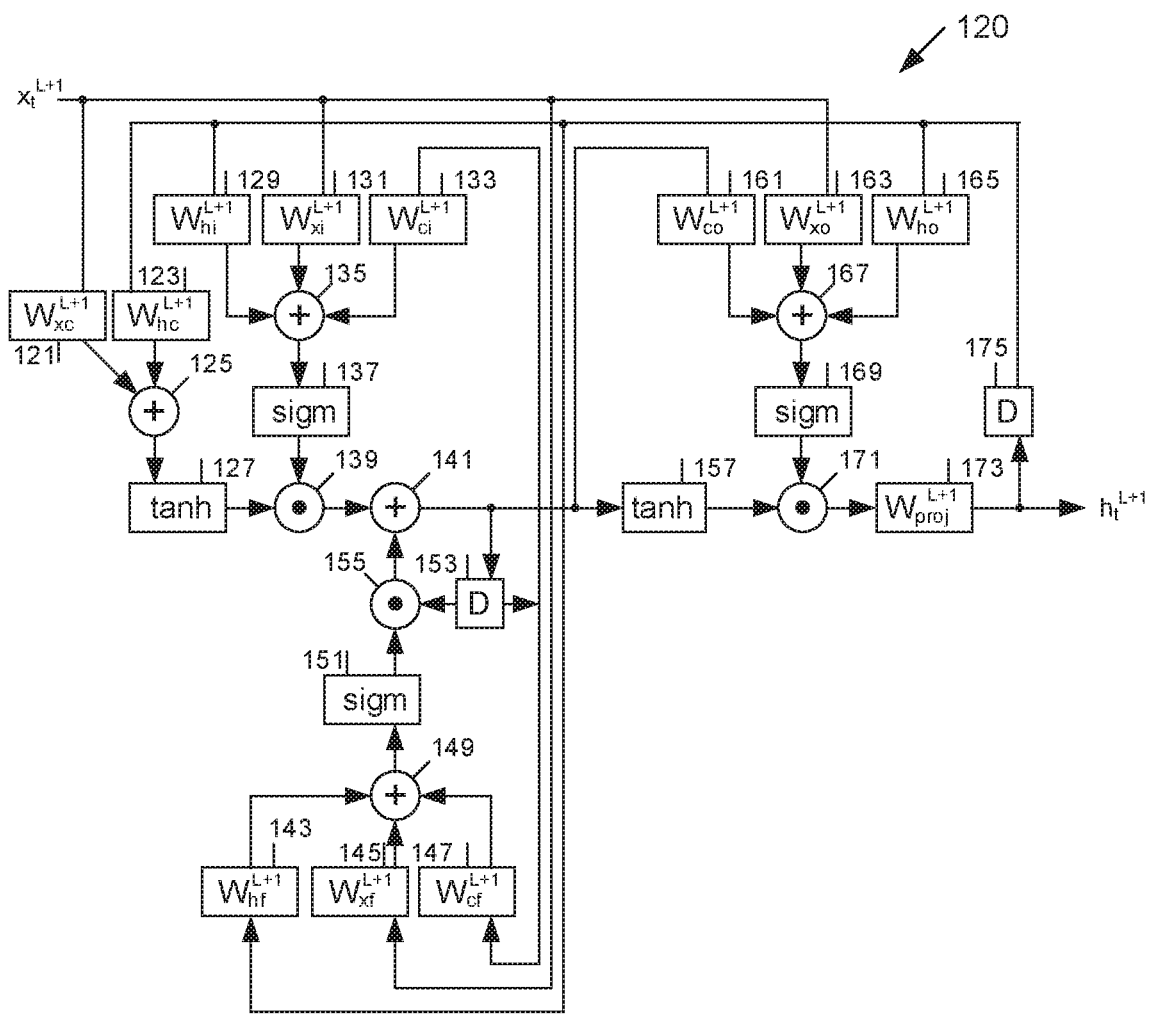
FIG. 1B is a block diagram of a full version of an LSTM network architecture.

FIG. 1B is a block diagram of a full version LSTM network 120, according to an embodiment of the present disclosure.

Referring to FIG. 1B, the full version LSTM network 120 in a layer (e.g., layer L+1) includes a first weight block $W_{xc}^{L+1}$ 121 for a new input $j_t^{L+1}$ that includes an input for receiving an input $x_t^{L+1}$ of the full version LSTM network 120 at layer L+1, and an output. A second weight block $W_{hc}^{L+1}$ of the new input $j_t^{L+1}$ includes an input for receiving a first output $h_{t-1}^{L+1}$ of the full version LSTM network 120 at layer L+1 that is the output of a previous time, and an output. A first component-wise adder 125 includes a first input connected to the output of the first weight block $W_{xc}^{L+1}$ 121 of the new input $j_t^{L+1}$, a second input connected to the output of the second weight block $W_{hc}^{L+1}$ of the new input $j_t^{L+1}$, and an output. A first hyperbolic tangent block tanh 127 includes an input connected to the output of the first component-wise adder 125, and an output that provides the new input $j_t^{L+1}$ as described in Equation (4) above. However, the present disclosure is not limited to using tanh. Any other suitable function may be used (e.g., sigm).

The full version LSTM network 120 includes a first weight block $W_{hi}^{L+1}$ 129 for an input $i_t^{L+1}$ that includes an input for receiving the first output $h_{t-1}^{L+1}$ of the full version LSTM network 120 at layer L+1 that is the output of a previous time, and an output. A second weight block $W_{xh}^{L+1}$ 131 of the input $i_t^{L+1}$ includes an input for receiving the input $x_t^{L+1}$ of the full version LSTM network 120 at layer L+1, and an output. A third weight block $W_{ci}^{L+1}$ 133 of the input $i_t^{L+1}$ includes an input for receiving a first activation $c_{t-1}^{L+1}$ of the full version LSTM network 120 at layer L+1 that is the second activation of a previous time, and an output. A second component-wise adder 135 includes a first input connected to the output of the first weight block $W_{hi}^{L+1}$ 129 of the input $i_t^{L+1}$, a second input connected to the output of the second weight block $W_{xi}^{L+1}$ 131 of the input $i_t^{L+1}$, a third input connected to the output of the third weight block $W_{ci}^{L+1}$ 133 of the input $i_t^{L+1}$, and an output. A first sigmoid block sign 137 includes an input connected to the output of the second component-wise adder 135, and an output that provides the input $i_t^{L+1}$ as described in Equation (3) above. However, the present disclosure is not limited to using sigm. Any other suitable function may be used (e.g., tanh).

The full version LSTM network 120 includes a first component-wise product block 139 (e.g., a component-wise multiplier) that includes a first input connected to the output of the first tanh block 127, a second input connected to the output of the first sigm block 137, and an output. A third component-wise adder 141 includes a first input connected to the output of the first component-wise product block 139, a second input, and an output that provides a second activation $c_t^{L+1}$ of the residual LSTM network 120 at layer L+1.

The full version LSTM network 120 includes a first weight block $W_{hf}^{L+1}$ 143 for a forget function $f_t^{L+1}$ that includes an input for receiving the input $x_t^{L+1}$ of the full version LSTM network 120 at layer L+1, and an output. A second weight block $W_{xf}^{L+1}$ 145 of the forget function $f_t^{L+1}$ includes an input for receiving the first output $h_{t-1}^{L+1}$ of the full version LSTM network 120 at layer L+1 that is the output of a previous time, and an output. A third weight block $W_{cf}^{L+1}$ 147 of the forget function $f_t^{L+1}$ includes an input for receiving the first activation $c_{t-1}^{L+1}$ of the residual LSTM network 120 at layer L+1 that is the second activation of a previous time, and an output. A fourth component-wise adder 149 includes a first input connected to the output of the first weight block $W_{hf}^{L+1}$ 143 of the forget function $f_t^{L+1}$, a second input connected to the output of the second weight block $W_{xf}^{L+1}$ 145 of the forget function $f_t^{L+1}$, a third input connected to the output of the third weight block $W_{cf}^{L+1}$ 147 of the forget function $f_t^{L+1}$, and an output. A second sigmoid block sigm 151 includes an input connected to the output of the fourth component-wise adder 149, and an output that provides the forget function $f_t^{L+1}$ as described in Equation (2) above. However, the present disclosure is not limited to using sigm. Any other suitable function may be used (e.g., tanh).

The full version LSTM network 120 includes a first highway, or depth, gate 153 that includes an input connected to the output of the third component-wise adder 141, and a first output for providing the first activation $c_{t-1}^{L+1}$ of the full version LSTM network 120 at layer L+1 that is the second activation of a previous time, and a second output for providing the first activation $c_{t-1}^{L+1}$ connected to the input of the third weight block $W_{ci}^{L+1}$ 133 of the input $i_t^{L+1}$ and the input of the third weight block $W_{cf}^{L+1}$ 147 of the forget function $f_t^{L+1}$. A second component-wise product block 155 includes a first input connected to the output of the second sigm block 151, a second input connected to the output of the first depth gate 153, and an output connected to the second input of the third component-wise adder 141.

The full version LSTM network 120 includes a second tanh block 157 for providing a full version function that includes an input connected to the output of the third component-wise adder 141, and an output. However, the present disclosure is not limited to using tanh. Any other suitable function may be used (e.g., sigm).

The full version LSTM network 120 includes a first weight block $W_{co}^{L+1}$ 161 for an output $o_t^{L+1}$ that includes an input connected to the output of the third component-wise adder 141 for receiving the second activation $c_t^{L+1}$, and an output. A second weight block $W_{xo}^{L+1}$ 163 of the output $o_t^{L+1}$ includes an input for receiving the input $x_t^{L+1}$ of the full version LSTM network 120 at layer L+1, and an output. A third weight block $W_{ho}^{L+1}$ 165 of the output $o_t^{L+1}$ includes an input for receiving the first output $h_{t-1}^{L+1}$ of the full version LSTM network 120 at layer L+1 that is the second output of a previous time, and an output. A fifth component-wise adder 167 includes a first input connected to the output of the first weight block $W_{co}^{L+1}$ 161 of the output $o_t^{L+1}$, a second input connected to the output of the second weight block $W_{xo}^{L+1}$ 163 of the output $o_t^{L+1}$, a third input connected to the output of the third weight block $W_{ho}^{L+1}$ 165 of the output $o_t^{L+1}$, and an output. A third sigmoid block sigm 169 includes an input connected to the output of the fifth component-wise adder 167, and an output that provides the output $o_t^{L+1}$ as described in Equation (5) above. However, the present disclosure is not limited to using sigm. Any other suitable function may be used (e.g., tanh).

The full version LSTM network 120 includes a third component-wise product block 171 that includes a first input connected to the output of the second tanh block 157, a second input connected to the output of the third sigm block 169, and an output. A projection weight block $W_{proj}^{L+1}$ includes an input and an output that provides a second $h_t^{L+1}$, where the input is connected to the output of the third component-wise product block 171. A second depth gate 175 for providing the first output $h_{t-1}^{L+1}$ includes an input connected to the output of the projection weight block $W_{proj}^{L+1}$ 173 $h_t^{L+1}$, and an output connected to the input of the second weight block $W_{hc}^{L+1}$ 123 of the new input $j_t^{L+1}$, the input of the first weight block $W_{hi}^{L+1}$ 129 of the input $i_t^{L+1}$, the input of the first weight block $W_{hf}^{L+1}$ 143 of the forget function $f_t^{L+1}$, and the input of the third weight block $W_{ho}^{L+1}$ 165 of the output $o_t^{L+1}$.

Figure 2:
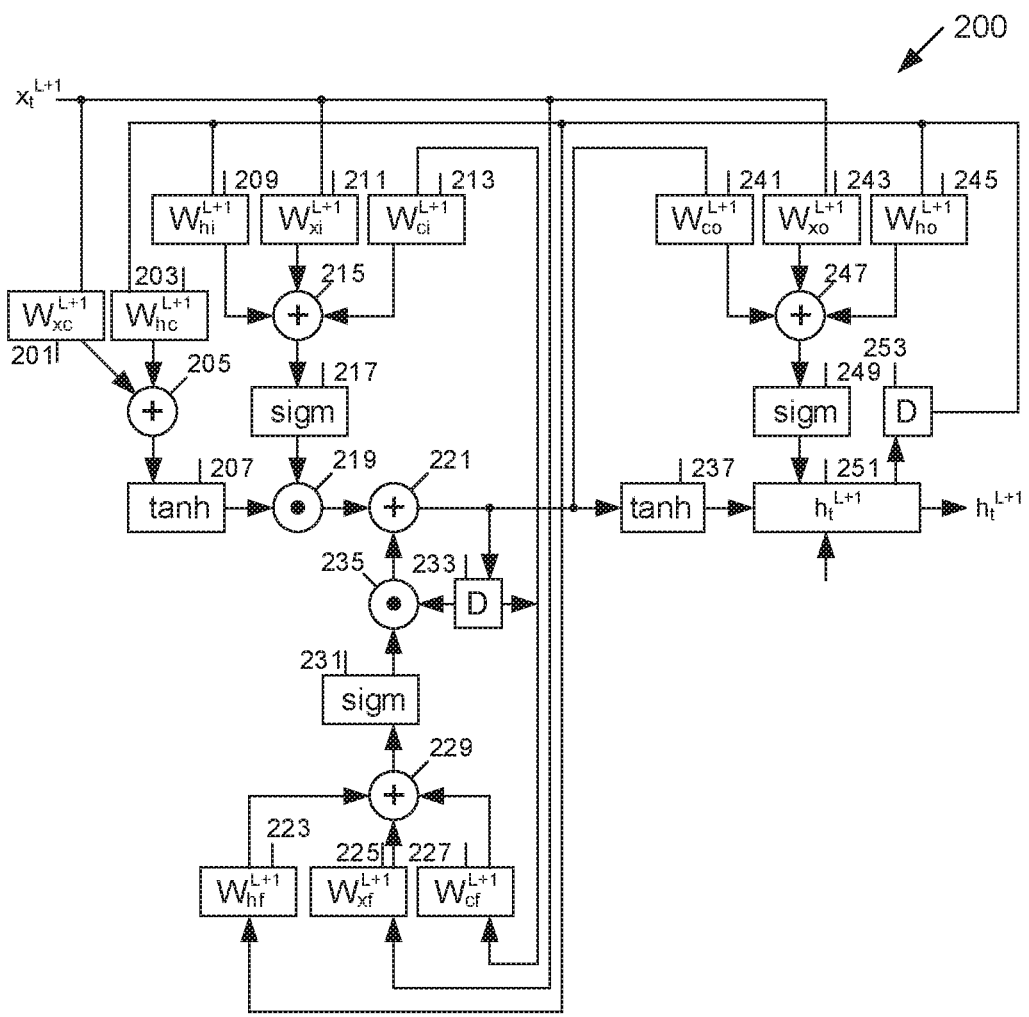
FIG. 2 is a block diagram of a residual LSTM network, according to an embodiment of the present disclosure.

FIG. 2 is a block diagram of a residual LSTM network 200, according to an embodiment of the present disclosure.

Referring to FIG. 2, the residual LSTM network 200 in a layer (e.g., layer L+1) includes a first weight block $W_{xc}^{L+1}$ 201 for a new input $j_t^{L+1}$ that includes an input for receiving an input $x_t^{L+1}$ of the residual LSTM network 200 at layer L+1, and an output. A second weight block $W_{hc}^{L+1}$ 203 of the new input $j_t^{L+1}$ includes an input for receiving a first output $h_{t-1}^{L+1}$ of the residual LSTM network 200 at layer L+1 that is the output of a previous time, and an output. A first component-wise adder 205 includes a first input connected to the output of the first weight block $W_{xc}^{L+1}$ 201 of the new input $j_t^{L+1}$, a second input connected to the output of the second weight block $W_{hc}^{L+1}$ 203 of the new input $j_t^{L+1}$, and an output. A first hyperbolic tangent block tanh 207 includes an input connected to the output of the first component-wise adder 205, and an output that provides the new input $j_t^{L+1}$ as described in Equation (4) above. However, the present disclosure is not limited to using tanh. Any other suitable function may be used (e.g., sigm).

The residual network 200 includes a first weight block $W_{hi}^{L+1}$ 209 for an input $i_t^{L+1}$ that includes an input for receiving the first output $h_{t-1}^{L+1}$ of the residual LSTM network 200 at layer L+1 that is the output of a previous time, and an output. A second weight block $W_{xh}^{L+1}$ 211 of the input $i_t^{L+1}$ includes an input for receiving the input $x_t^{L+1}$ of the residual LSTM network 200 at layer L+1, and an output. A third weight block $W_{ci}^{L+1}$ 213 of the input $i_t^{L+1}$ includes an input for receiving a first activation $c_{t-1}^{L+1}$ of the residual LSTM network 200 at layer L+1 that is the second activation of a previous time, and an output. A second component-wise adder 215 includes a first input connected to the output of the first weight block $W_{hi}^{L+1}$ 209 of the input $i_t^{L+1}$, a second input connected to the output of the second weight block $W_{xi}^{L+1}$ 211 of the input $i_t^{L+1}$, a third input connected to the output of the third weight block $W_{ci}^{L+1}$ 213 of the input $i_t^{L+1}$, and an output. A first sigmoid block sigm 217 includes an input connected to the output of the second component-wise adder 215, and an output that provides the input $i_t^{L+1}$ as described in Equation (3) above. However, the present disclosure is not limited to using sigm. Any other suitable function may be used (e.g., tanh).

The residual LSTM network 200 includes a first component-wise product block 219 (e.g., a component-wise multiplier) that includes a first input connected to the output of the first tanh block 207, a second input connected to the output of the first sigm block 217, and an output. A third component-wise adder 221 includes a first input connected to the output of the first component-wise product block 219, a second input, and an output that provides a second activation $c_t^{L+1}$ of the residual LSTM network 200 at layer L+1.

The residual LSTM network 200 includes a first weight block $W_{hf}^{L+1}$ 223 for a forget function $f_t^{L+1}$ that includes an input for receiving the input $x_t^{L+1}$ of the residual LSTM network 200 at layer L+1, and an output. A second weight block $W_{xf}^{L+1}$ 225 of the forget function $f_t^{L+1}$ includes an input for receiving the first output $h_{t-1}^{L+1}$ of the residual LSTM network 200 at layer L+1 that is the output of a previous time, and an output. A third weight block $W_{cf}^{L+1}$ 227 of the forget function $f_t^{L+1}$ includes an input for receiving the first activation $c_{t-1}^{L+1}$ of the residual LSTM network 200 at layer L+1 that is the second activation of a previous time, and an output. A fourth component-wise adder 229 includes a first input connected to the output of the first weight block $W_{hf}^{L+1}$ 223 of the forget function $f_t^{L+1}$, a second input connected to the output of the second weight block $W_{xf}^{L+1}$ 225 of the forget function $f_t^{L+1}$, a third input connected to the output of the third weight block $W_{cf}^{L+1}$ 227 of the forget function $f_t^{L+1}$, and an output. A second sigmoid block sigm 231 includes an input connected to the output of the fourth component-wise adder 229, and an output that provides the forget function $f_t^{L+1}$ as described in Equation (2) above. However, the present disclosure is not limited to using sigm. Any other suitable function may be used (e.g., tanh).

The residual LSTM network 200 includes a first highway, or depth, gate 233 that includes an input connected to the output of the third component-wise adder 221, and a first output for providing the first activation $c_{t-1}^{L+1}$ of the residual LSTM network 200 at layer L+1 that is the second activation of a previous time, and a second output for providing the first activation $c_{t-1}^{L+1}$ connected to the input of the third weight block $W_{ci}^{L+1}$ 213 of the input $i_t^{L+1}$ and the input of the third weight block $W_{cf}^{L+1}$ 227 of the forget function $f_t^{L+1}$. A second component-wise product block 235 includes a first input connected to the output of the second sigm block 231, a second input connected to the output of the first depth gate 233, and an output connected to the second input of the third component-wise adder 221.

The residual LSTM network 200 includes a second tanh block 237 for providing a residual function $r_t^{L+1}$ (i.e., $o_t^{L+1} \odot \tanh(c_t^{L+1})$) that includes an input connected to the output of the third component-wise adder 221, and an output. However, the present disclosure is not limited to using tanh. Any other suitable function may be used (e.g., sigm).

The residual LSTM network 200 includes a first weight block $W_{co}^{L+1}$ 241 for an output $o_t^{L+1}$ that includes an input connected to the output of the third component-wise adder 221 for receiving the second activation $c_t^{L+1}$, and an output. A second weight block $W_{xo}^{L+1}$ 243 of the output $o_t^{L+1}$ includes an input for receiving the input $x_t^{L+1}$ of the residual LSTM network 200 at layer L+1, and an output. A third weight block $W_{ho}^{L+1}$ 245 of the output $o_t^{L+1}$ includes an input for receiving the first output $h_{t-1}^{L+1}$ of the residual LSTM network 200 at layer L+1 that is the second output of a previous time, and an output. A fifth component-wise adder 247 includes a first input connected to the output of the first weight block $W_{co}^{L+1}$ 241 of the output $o_t^{L+1}$, a second input connected to the output of the second weight block $W_{xo}^{L+1}$ 243 of the output $o_t^{L+1}$, a third input connected to the output of the third weight block $W_{ho}^{L+1}$ 245 of the output $o_t^{L+1}$, and an output. A third sigmoid block sigm 249 includes an input connected to the output of the fifth component-wise adder 247, and an output that provides the output $o_t^{L+1}$ as described in Equation (5) above. However, the present disclosure is not limited to using sigm. Any other suitable function may be used (e.g., tanh).

The residual LSTM network 200 includes an $h_t^{L+1}$ block 251 for providing a second output $h_t^{L+1}$ that includes a first input connected to the output of the second tanh block 237, a second input connected to the output of the third sigm block 249, a third input for receiving the input $x_t^{L+1}$ or an output of a highway block (e.g., $$\left(\text{e.g.,} \sum_{i=1}^{N} (W_{hi}^{L+1} h_t^{L+1-i})\right),$$

a first output providing the second output $h_t^{L+1}$, and a second output providing the second output $h_t^{L+1}$. A second highway, or depth, gate 253 for providing the first output $h_{t-1}^{L+1}$ includes an input connected to the first output of the $h_t^{L+1}$ block 251, and an output connected to the input of the second weight block $W_{hc}^{L+1}$ 203 of the new input $j_t^{L+1}$, the input of the first weight block $W_{hi}^{L+1}$ of the input $i_t^{L+1}$, the input of the first weight block $W_{hf}^{L+1}$ 223 of the forget function $f_t^{L+1}$, and the input of the third weight block $W_{ho}^{L+1}$ of the output $o_t^{L+1}$.

Figure 3:
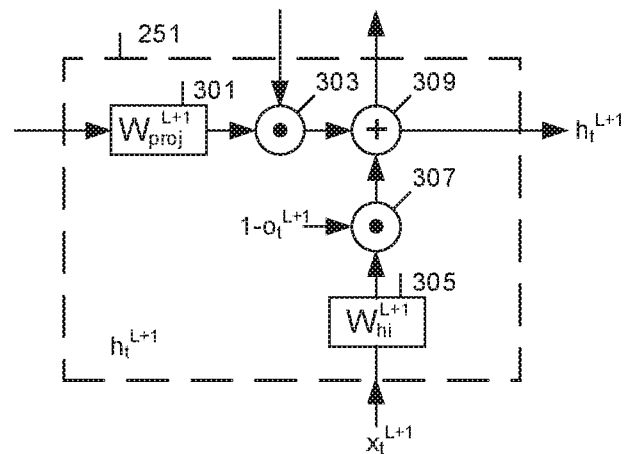
FIG. 3 is a block diagram of an $h_t^{L+1}$ block of FIG. 2 for reusing an LSTM output gate to control a highway connection, according to an embodiment of the present disclosure.
Figure 4:
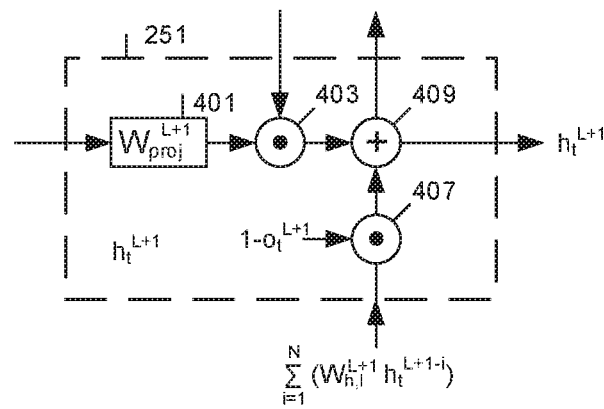
FIG. 4 is a block diagram of an $h_t^{L+1}$ block of FIG. 2 for reusing an LSTM output gate to control multiple highway connections, according to an embodiment of the present disclosure.
Figure 5:
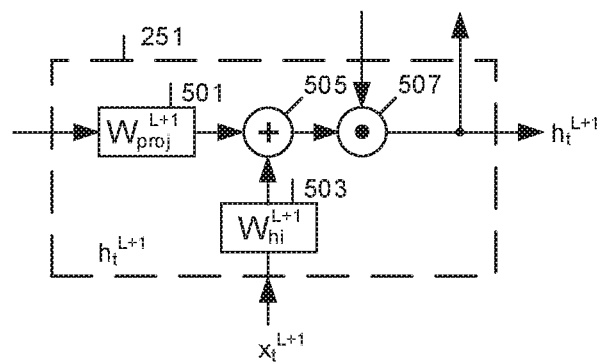
FIG. 5 is a block diagram of an $h_t^{L+1}$ block of FIG. 2 for using a projection matrix to control a highway connection, according to an embodiment of the present disclosure.
Figure 6:
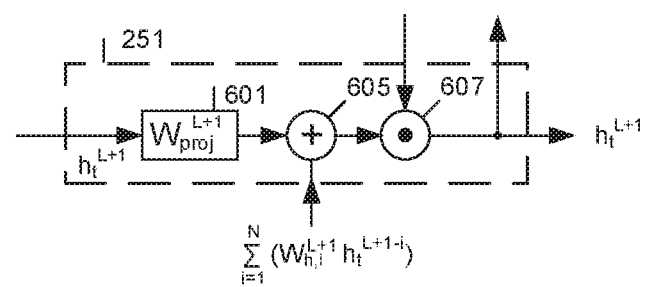
FIG. 6 is a block diagram of an $h_t^{L+1}$ block of FIG. 2 for using a projection matrix to control multiple highway connections, according to an embodiment of the present disclosure.
Figure 7:
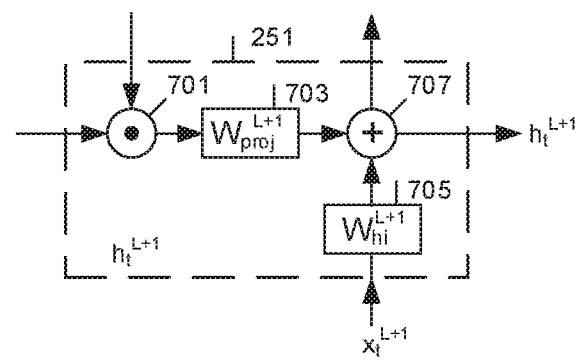
FIG. 7 is a block diagram of an $h_t^{L+1}$ block of FIG. 2 for linearly adding all prior layers to control a highway connection, according to an embodiment of the present disclosure.

The first output of the $h_t^{L+1}$ block 251 residual LSTM network 200 may be configured to (1) reuse an LSTM output gate to control a highway connection as illustrated in FIG. 3 and described below in more detail, (2) reuse an LSTM output gate to control multiple highway connections as illustrated in FIG. 4 and described below in more detail, (3) use a projection matrix to control a highway connection as illustrated in FIG. 5 and described below in more detail, (4) use a projection matrix to control multiple highway connections as illustrated in FIG. 6 and described below in more detail, and (5) linearly add all prior layers to control a highway connection as illustrated in FIG. 7 and described below in more detail.

FIG. 3 is a block diagram of the $h_t^{L+1}$ block 251 of FIG. 2 for reusing an LSTM output gate to control a highway connection, according to an embodiment of the present disclosure.

According to one embodiment, the residual LSTM network 200 optimizes a highway connection by reusing an output gate. The purpose of the output gate for a LSTM network is to control how much a current LSTM layer output should be actually leaked into a subsequent layer. If an output gate for a hidden unit is turned off, the network considers the corresponding hidden unit to be not helpful. The residual LSTM network 200 uses more of an output of a prior layer when a ratio of an output gate of the prior layer to an output gate of the current layer decreases. The idea is to use an output of a prior layer when a subsequent layer cannot provide a better output.

Referring to FIG. 3, the $h_t^{L+1}$ block 251 includes a projection weight block $W_{proj}^{L+1}$ 301, a first component-wise product block 303, a highway weight block $W_{hi}^{L+1}$ 305, a second component-wise product block 307, and a component-wise adder 309.

The projection weight block $W_{proj}^{L-1}$ 301 includes an input and an output, where the input is connected to the output of the tanh block 237 in FIG. 2. The first component-wise product block 303 includes a first input connected to the output of the projection weight block $W_{proj}^{L+1}$ 301, a second input, and an output, where the second input is connected to the output of the third sigm block 249 in FIG. 2. The highway weight block $W_{hi}^{L+1}$ 305 includes an input for receiving the input $x_t^{L+1}$ of the residual LSTM network 200 at layer L+1, and an output. The second component-wise product block 307 includes a first input connected to the output of the highway weight block $W_{hi}^{L+1}$ 305, a second input for receiving $1-o_t^{L+1}$, and an output. The component-wise adder 309 includes a first input connected to the output of the first component-wise product block 303, a second input connected to the output of the second component-wise product block 307, a first output that provides $h_t^{L+1}$, and a second output of the residual LSTM network 200 that provides $h_t^{L+1}$, where the first output is connected to the input of the second depth gate 253 in FIG. 2.

The output $h_t^{L+1}$ of the residual LSTM network 200 implemented with the $h_t^{L+1}$ block 251 of FIG. 3 may be expressed as in Equation (18) as follows:

$$h_t^{L+1} = o_t^{L+1} \odot W_{proj}^{L+1} \tanh(c_t^{L+1}) + (1-o_t^{L+1}) \odot W_h^{L+1} x_t^{L+1} \quad (18)$$

where $W_h^{L+1}$ is a dimension matching matrix $W_h^{L+1}$ is an identity matrix when the input dimension and the output dimension matches each other. Otherwise, the dimension of $W_h^{L+1}$ becomes M×K (M output dimension, K input dimension). $W_{proj}^{L+1}$ is a projection matrix that decreases the output dimension from N to M. $x_t^{L+1}$ is input from the output of a previous layer.

An output gate $h_t^L$, an input gate $i_t^{L+1}$, a forget gate $f_t^{L+1}$, a new input $j_t^{L+1}$, a highway gate $y_t^{L+k}$, a cell activation $c_t^{L+1}$, and a cell output activation $o_t^{L+1}$ of may be represented in Equations (19)-(25) as follows:

$$x_t^{L+1} = h_t^L \quad (19)$$

$$i_t^{L+1} = \text{sigm}(W_{xi}^{L+1} x_t^{L+1} + W_{hi}^{L+1} h_{t-1}^{L+1} + W_{ci}^{L+1} \odot c_{t-1}^{L+} 1 + b_i^{L+1}) \quad (20)$$

$$f_t^{L+1} = \text{sigm}(W_{xf}^{L+1} x_t^{L+1} + W_{hf}^{L+1} h_{t-1}^{L+1} + W_{cf}^{L+1} \odot c_{t-1}^{L+1} + b_f^{L+1}) \quad (21)$$

$$j_t^{L+1} = \tanh(W_{xc}^{L+1} x_t^{L+1} + W_{hc}^{L+1} h_{t-1}^{L+1} + b_j^{L+1}) \quad (22)$$

$$c_t^{L+1} = f_t^{L+1} \odot c_{t-1}^{L+1} + i_t^{L+1} \odot j_t^{L+1} \quad (23)$$

$$o_t^{L+1} = \text{sigm}(W_{xo}^{L+1} x_t^{L+1} + W_{ho}^{L+1} h_{t-1}^{L+1} + W_{co}^{L+1} c_t^{L+1} + b_o^{L+1}) \quad (24)$$

$o_t^{L+1}$ is moved after a projection operation. Therefore, if the cell dimension is not the same as the output dimension, due to dimension mismatch, $W_{co}^{L+1}$ in $o_t^{L+1}$ is changed into a matrix from a vector.

FIG. 4 is a block diagram of the $h_t^{L+1}$ block 251 of FIG. 2 for reusing an LSTM output gate to control multiple highway connections, according to an embodiment of the present disclosure.

Referring to FIG. 4, the $h_t^{L+1}$ block 251 includes a projection weight block $W_{proj}^{L+1}$ 401, a first component-wise product block 403, a multiple highway weight block $$\sum_{i=1}^{N} (W_{hi}^{L+1} h_t^{L+1-i})$$

405, a second component-wise product block 407, and a component-wise adder 409.

The projection weight block $W_{proj}^{L-1}$ 401 includes an input and an output, where the input is connected to the output of the tanh block 237 in FIG. 2. The first component-wise product block 403 includes a first input connected to the output of the projection weight block $W_{proj}^{L+1}$ 401, a second input, and an output, where the second input is connected to the output of the third sigm block 249 in FIG. 2. The second component-wise product block 407 includes a first input for receiving an output of a highway weight block $$\sum_{i=1}^{N} (W_{hi}^{L+1} h_t^{L+1-i}),$$

a second input for receiving $1-o_t^{L+1}$, and an output. The highway weight block $$\sum_{i=1}^{N}(W_{hi}^{L+1}h_t^{L+1-i})$$

includes an input for receiving the inputs $W_{hi}^{L+1}h_t^{L+1-i}$, for i equals 1 to N, of the residual LSTM network 200 at layer L+1, and an output. The component-wise adder 409 includes a first input connected to the output of the first component-wise product block 403, a second input connected to the output of the second component-wise product block 407, a first output that provides $h_t^{L+1}$, and a second output of the residual LSTM network 200 that provides $h_t^{L+1}$, where the first output is connected to the input of the second depth gate 253 in FIG. 2.

The residual LSTM network 200 implemented with the $h_t^{L+1}$ block 251 of FIG. 4 provides a highway connection that is a summation of outputs of prior layers. $W_{h,i}^{L+1}$ may be used for two purposes. First, only an output of a prior layer that has a $W_{h,i}^{L+1}$ that is nonzero may be selected. For example, if $h_t^L$ and $h_t^{L-2}$ have $W_{h,1}^{L+1}$ and $W_{h,3}^{L+1}$ have and that are nonzero, they may be selected for a highway connection, and all other $W_{h,i}^{L+1}$ are assumed to be zero. Second, if an input dimension matches an output dimension, a nonzero $W_{h,i}^{L+1}$ becomes an identity matrix. The output $h_t^{L+1}$ of the residual LSTM network 200 implemented with the $h_t^{L+1}$ block 251 of FIG. 4 may be expressed as in Equation (25) as follows:

$$h_t^{L+1} = o_t^{L+1} \odot W_{proj}^{L+1}\tanh(c_t^{L+1}) + (1 - o_t^{L+1}) \odot \left(\sum_{i=1}^{N} W_{h,i}^{L+1}h_t^{L+1-i}\right). \quad (25)$$

An output gate $h_t^L$, an input gate $i_t^{L+1}$, a forget gate $f_t^{L+1}$, a new input $j_t^{L+1}$, a highway gate $y_t^{L+k}$, a cell activation $c_t^{L+1}$, and a cell output activation $o_t^{L+1}$ may be represented in Equations (19)-(24) above.

FIG. 5 is a block diagram of the $h_t^{L+1}$ block 251 of FIG. 2 for using a projection matrix to control a highway connection, according to an embodiment of the present disclosure.

Referring to FIG. 5, the $h_t^{L+1}$ block 251 includes a projection weight block $W_{proj}^{L+1}$ 501, a highway weight block $W_{hi}^{L+1}$ 503, a component-wise adder 505, and a component-wise product block 507.

The projection weight block $W_{proj}^{L-1}$ 501 includes an input and an output, where the input is connected to the output of the tank block 237 in FIG. 2. The highway weight block $W_{hi}^{L+1}$ 503 includes an input for receiving the input $x_t^{L+1}$ of the residual LSTM network 200 at layer L+1, and an output. The component-wise adder 505 includes a first input connected to the output of the projection weight block $W_{proj}^{L+1}$ 501, a second input connected to the output of the highway weight block $W_{hi}^{L+1}$ 503, and an output. The component-wise product block 507 includes a first input connected to the output of the component-wise adder 505, a second input, a first output that provides $h_t^{L+1}$, and a second output of the residual LSTM network 200 that provides $h_t^{L+1}$, where the second input is connected to the output of the third sigm block 249 in FIG. 2, and where the first output is connected to the input of the second depth gate 253 in FIG. 2.

According to one embodiment, the residual LSTM network 200 applies an output gate to both a highway connection and a main path output, where the highway connection may be expressed as in Equation (26) as follows:

$$h_t^{L+1} = o_t^{L+1} \odot (W_{proj}^{L+1}\tanh(c_t^{L+1}) + W_h^{L+1}x_t^{L+1}) \quad (26)$$

where $W_h^{L+1}$ is a dimension matching matrix. $W_h^{L+1}$ is an identity matrix when the input dimension and the output dimension matches each other. Otherwise, the dimension of $W_h^{L+1}$ becomes M×K (M output dimension, K input dimension). $W_{proj}^{L+1}$ is a projection matrix that decreases output dimension from N to M. $x_t^{L+1}$ is input from previous layer output (or input feature).

FIG. 6 is a block diagram of the $h_t^{L+1}$ block 251 of FIG. 2 for using a projection matrix to control multiple highway connections, according to an embodiment of the present disclosure.

Referring to FIG. 6, the $h_t^{L+1}$ block 251 includes a projection weight block $W_{proj}^{L+1}$ 601, a multiple highway weight block $$\sum_{i=1}^{N}(W_{hi}^{L+1}h_t^{L+1-i})$$

603, a component-wise adder 605, and a component-wise product block 607.

The projection weight block $W_{proj}^{L-1}$ 601 includes an input and an output, where the input is connected to the output of the tanh block 237 in FIG. 2. The component-wise adder 605 includes a first input connected to the output of the projection weight block $W_{proj}^{L+1}$ 601, a second input connected to an output of a multiple highway weight block $$\sum_{i=1}^{N}(W_{hi}^{L+1}h_t^{L+1-i}),$$

and an output. The multiple highway weight block $$\sum_{i=1}^{N}(W_{hi}^{L+1}h_t^{L+1-i})$$

includes an input for receiving the inputs $W_{hi}^{L+1}h_t^{L+1-i}$, for i equals 1 to N, of the residual LSTM network 200 at layer L+1, and an output. The component-wise product block 607 includes a first input connected to the output of the component-wise adder 605, a second input, a first output that provides $h_t^{L+1}$, and a second output of the residual LSTM network 200 that provides $h_t^{L+1}$, where the second input is connected to the output of the third sigm block 249 in FIG. 2, and where the first output is connected to the input of the second depth gate 253 in FIG. 2.

The residual LSTM network 200 implemented with the $h_t^{L+1}$ block 251 of FIG. 6 provides an output gate to both a plurality of highway connections and a main path output. The highway connection is now a summation of outputs of prior layers. $W_{h,i}^{L+1}$ is used for two purposes. First, only an output of a prior layer that has a $W_{h,i}^{L+1}$ that is nonzero may be selected. For example, if $W_{h,1}^{L+1}$ and $W_{h,3}^{L+1}$ are nonzero then $h_t^L$ and $h_t^{L-2}$ may each be selected for a highway connection, then all other $W_{h,i}^{L+1}$ are assumed to be zero. Second, if an input dimension and an output dimension match, a nonzero $W_{h,i}^{L+1}$ becomes an identity matrix. The output $h_t^{L+1}$ of the residual LSTM network 200 implemented with the $h_t^{L+1}$ block 251 of FIG. 6 may be expressed as in Equation (27) as follows:

$$h_t^{L+1} = o_t^{L+1} \odot \left( W_{proj}^{L+1} \tanh(c_t^{L+1}) + \sum_{i=1}^{N} W_{h,i}^{L+1} h_t^{L+1-i} \right) \quad (27)$$

The other update equations are similar as for proposal 2-a.

FIG. 7 is a block diagram of the $h_t^{L+1}$ block 251 of FIG. 2 for linearly adding all prior layers to control a highway connection, according to an embodiment of the present disclosure.

Referring to FIG. 7, the $h_t^{L+1}$ block 251 includes a component-wise product block 701, a projection weight block $W_{proj}^{L+1}$ 703, a highway weight block $W_{hi}^{L+1}$ 705, and a component-wise adder 707.

The component-wise product block 701 includes a first input, a second input, and an output, where the first input is connected to the output of the tanh block 237 in FIG. 2, and where the second input is connected to the output of the third sigm block 249 in FIG. 2. The projection weight block $W_{proj}^{L+1}$ 703 includes an input connected to the output of the component-wise product block 701, and an output. The highway weight block $W_{hi}^{L+1}$ 705 includes an input for receiving the input $x_t^{L+1}$ of the residual LSTM network 200 at layer L+1, and an output. The component-wise adder 707 includes a first input connected to the output of the projection weight block $W_{proj}^{L+1}$ 703, a second input connected to the output of the highway weight block $W_{hi}^{L+1}$ 705, a first output that provides $h_t^{L+1}$, and a second output of the residual LSTM network 200 that provides $h_t^{L+1}$, where the first output is connected to the input of the second depth gate 253 in FIG. 2.

According to one embodiment, the residual LSTM network 200 includes a highway connection at the projection output. An output gate is multiplied before the projection block. Therefore, $w_{co}^{L+1}$ may be a vector, which indicates that M×(N−1) parameters are saved.

Furthermore, a shortcut path is linearly added for each LSTM output without any nonlinear activation gate network. Consequently, each layer input is a linear combination of all prior layers. Therefore, multiple shortcut connections are not required. Instead of an output gate, a projection matrix is used to control a ratio between a main path and a highway path.

The total parameter saving becomes 2M*(N−M)+4N. An output gate $h_t^L$, an input gate $i_t^{L+1}$, a forget gate $f_t^{L+1}$, a new input $j_t^{L+1}$, a highway gate $y_t^{L+k}$, a cell activation $c_t^{L+1}$, and a cell output activation $o_t^{L+1}$ may be represented in Equations (28)-(34) as follows:

$$x_t^{L+1} = h_t^L \quad (28)$$

$$i_t^{L+1} = \text{sigm}(W_{xi}^{L+1} x_t^{L+1} + W_{hi}^{L+1} h_{t-1}^{L+1} + W_{ci}^{L+1} \odot c_{t-1}^{L+1} + b_i^{L+1}) \quad (29)$$

$$f_t^{L+1} = \text{sigm}(W_{xf}^{L+1} x_t^{L+1} + W_{hf}^{L+1} h_{t-1}^{L+1} + W_{cf}^{L+1} \odot c_{t-1}^{L+1} + b_f^{L+1}) \quad (30)$$

$$j_t^{L+1} = \tanh(W_{xc}^{L+1} x_t^{L+1} + W_{hc}^{L+1} h_{t-1}^{L+1} + b_j^{L+1}) \quad (31)$$

$$c_t^{L+1} = f_t^{L+1} \odot c_{t-1}^{L+1} + i_t^{L+1} \odot j_t^{L+1} \quad (32)$$

$$o_t^{L+1} = \text{sigm}(W_{xo}^{L+1} x_t^{L+1} + W_{ho}^{L+1} h_{t-1}^{L+1} + W_{co}^{L+1} \odot c_t^{L+1} + b_o^{L+1}) \quad (33)$$

$$h_t^{L+1} = W_{proj}^{L+1}(o_t^{L+1} \odot \tanh(c_t^{L+1})) + W_h^{L+1} x_t^{L+1} \quad (34)$$

where $W_h^{L+1}$ is an identity matrix when K=M, $W_{proj}^{L+1}$ is projection matrix that decreases output dimension from N to M. $x_t^{L+1}$ is input from previous layer output (or input feature).

According to one embodiment, the present system and method provides a deep network with a large number of stacked layers having memory cells implicitly learn a residual function of an input that is later compensated by adding a linear projection of the input through a shortcut connection. The residual function is easier to learn than a non-residual mapping at increased depth thus providing better accuracy. The present network architecture does not use extra gate networks for a shortcut connection used for information flow (highway connection).

According to one embodiment, an output gate network of an LSTM is reused for an output gate network for a highway connection.

According to one embodiment, a linear projection matrix is indirectly used for a gate network to control a shortcut connection. A significantly less number of learnable parameters are required as compared to typical deep networks. Furthermore, a highway connection is applied between an input and an output of LSTM layers directly. With regard to improving gradient flow between layers, a highway connection on an output of a layer may be more appropriate than an internal memory cell.

Figures 8, 9, 10:
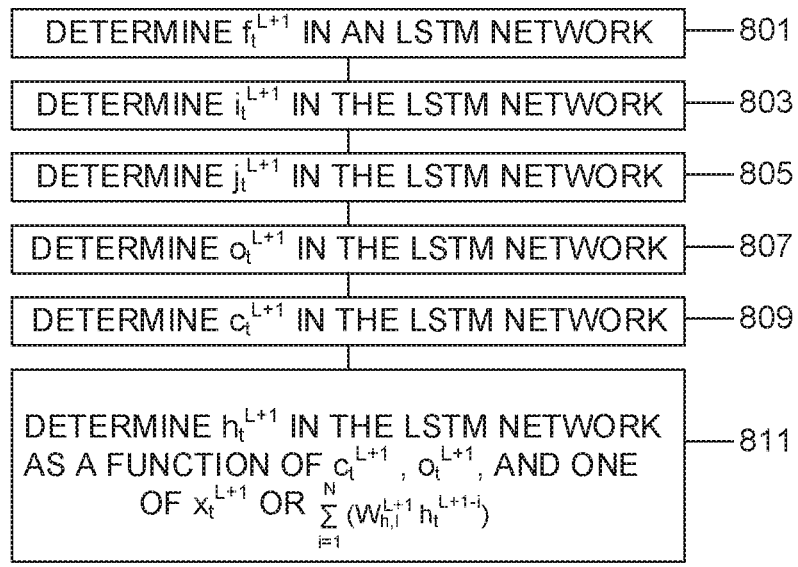
FIG. 8 is a flowchart of a method of a residual LSTM network, according to an embodiment of the present disclosure.
FIG. 9 is a flowchart of an $h_t^{L+1}$ step of FIG. 8 for reusing an LSTM output gate to control a highway connection, according to an embodiment of the present disclosure.
FIG. 10 is a flowchart of an $h_t^{L+1}$ step of FIG. 8 for reusing an LSTM output gate to control multiple highway connections, according to an embodiment of the present disclosure.

FIG. 8 is a flowchart of a method of a residual LSTM network, according to an embodiment of the present disclosure.

Referring to FIG. 8, $f_t^{L+1}$ is determined in the LSTM network at 801. In an embodiment of the present disclosure, $h_t^{L+1}$ is determined in accordance with Equation (2) above.

At 803, $i_t^{L+1}$ is determined in the LSTM network. In an embodiment of the present disclosure, $i_t^{L+1}$ is determined in accordance with Equation (3) above.

At 805, $j_t^{L+1}$ is determined in the LSTM network. In an embodiment of the present disclosure, $j_t^{L+1}$ is determined in accordance with Equation (4) above.

At 807, $o_t^{L+1}$ is determined in the LSTM network. In an embodiment of the present disclosure, $o_t^{L+1}$ is determined in accordance with Equation (5) above.

At 809, $c_t^{L+1}$ is determined in the LSTM network. In an embodiment of the present disclosure, $c_t^{L+1}$ is determined in accordance with Equation (6) above.

At 811, $h_t^{L+1}$ is determined in the LSTM network as a function of $c_t^{L+1}$, $o_t^{L+1}$, and one of $x_t^{L+1}$ or $$\sum_{i=1}^{N} (W_{hi}^{L+1} h_t^{L+1-i}).$$

In embodiments of the present disclosure, $h_t^{L+1}$ is determined in accordance with FIGS. 9-13 described below.

FIG. 9 is a flowchart of the $h_t^{L+1}$ step 811 of FIG. 8 for reusing an LSTM output gate to control a highway connection, according to an embodiment of the present disclosure.

Referring to FIG. 9, $h_t^{L+1}$ is determined as in Equation (18) above by the LSTM network at 811.

FIG. 10 is a flowchart of the $h_t^{L+1}$ step 811 of FIG. 8 for reusing an LSTM output gate to control multiple highway connections, according to an embodiment of the present disclosure.

Referring to FIG. 10, $h_t^{L+1}$ is determined as in Equation (25) above by the LSTM network at 811.

FIG. 11 is a flowchart of the $h_t^{L+1}$ step of FIG. 8 for using a projection x to control a highway connection, according to an embodiment of the present disclosure.

Referring to FIG. 11, $h_t^{L+1}$ is determined as in Equation (26) above by the LSTM network at 811.

FIG. 12 is a flowchart of the $h_t^{L+1}$ step of FIG. 8 for using a projection matrix to control multiple highway connections, according to an embodiment of the present disclosure.

Referring to FIG. 12, $h_t^{L+1}$ is determined as in Equation (27) above by the LSTM network at 811.

FIG. 13 is a flowchart of the $h_t^{L+1}$ step of FIG. 8 for linearly adding all prior layers to control a highway connection, according to an embodiment of the present disclosure.

Referring to FIG. 13, $h_t^{L+1}$ is determined as in Equation (34) above by the LSTM network at 811.

Figure 14:
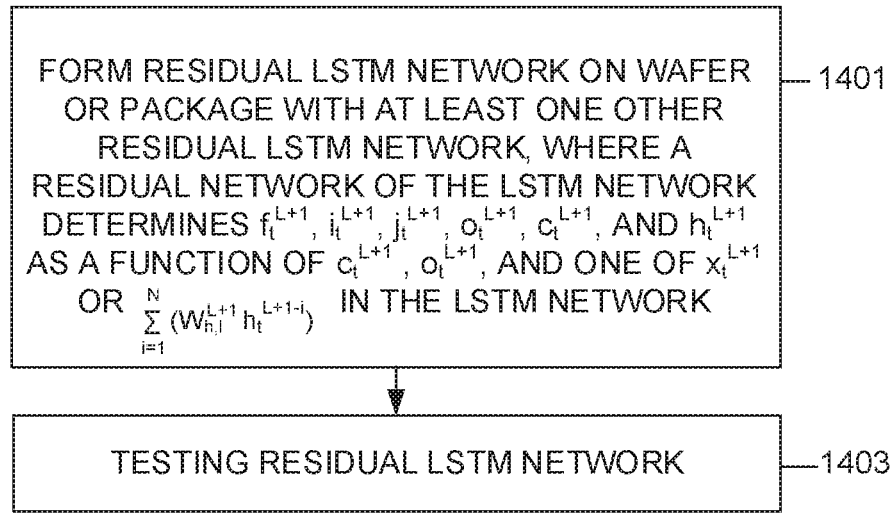
FIG. 14 is a flowchart of a method of manufacturing a residual LSTM network, according to an embodiment of the present disclosure.

FIG. 14 is a flowchart of a method of manufacturing a residual LSTM network, according to an embodiment of the present disclosure.

Referring to FIG. 14, a residual LSTM network is formed on a wafer or a package with at least one other residual LSTM, network, where a residual network of the LSTM network determines $f_t^{L+1}$, $i_t^{L+1}$, $j_t^{L+1}$, $o_t^{L+1}$, $c_t^{L+1}$, as in Equations (2)-(6) above, respectively, determines and $h_t^{L+1}$ as a function of $c_t^{L+1}$, $o_t^{L+1}$, and one of $x_t^{L+1}$ or $$\sum_{i=1}^{N}(W_{hi}^{L+1}h_t^{L+1-i})$$

in the LSTM network at 1401.

At 1402, the residual LSTM network is tested.

Figure 15:
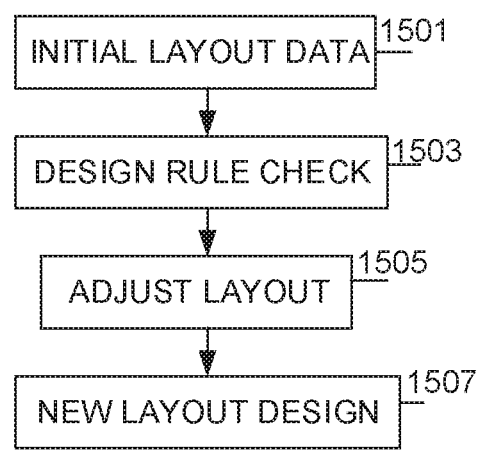
FIG. 15 is a flowchart of constructing an integrated circuit, according to an embodiment of the present disclosure.

FIG. 15 is a flowchart of constructing an integrated circuit, according to an embodiment of the present disclosure.

Referring to FIG. 15, initial layout data is constructed in 1501. For example, a mask layout is generated for a set of features for a layer of the integrated circuit, wherein the mask layout includes standard cell library macros for one or more circuit features that include an LSTM network in which a residual network of the LSTM network determines $f_t^{L+1}$, $i_t^{L+1}$, $j_t^{L+1}$, $o_t^{L+1}$, $c_t^{L+1}$, and $h_t^{L+1}$ as a function of $c_t^{L+1}$, $o_t^{L+1}$, and one of $x_t^{L+1}$ or $$\sum_{i=1}^{N}(W_{hi}^{L+1}h_t^{L+1-i})$$

in the LSTM network, and disregarding relative positions of the macros for compliance to layout design rules during the generation of the mask layout.

At 1503, a design rule check is performed. For example, the method may check the relative positions of the macros for compliance to layout design rules after generating the mask layout.

At 1505, the layout is adjusted. For example, the method, upon detection of noncompliance with the layout design rules by any of the macros, may modify the mask layout by modifying each of the noncompliant macros to comply with the layout design rules.

At 1507, new layout data is generated. For example, the method may generate a mask according to the modified mask layout with the set of features for the layer of the integrated circuit. Then, the integrated circuit layer according to the mask may be manufactured.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
a plurality of long short term memory (LSTM) networks,
wherein each of the plurality of LSTM networks is at a different network layer;
wherein each of the plurality of LSTM networks is configured to determine a residual function;
wherein each of the plurality of LSTM networks includes an output gate to control what is provided to a subsequent LSTM network; and
wherein each of the plurality of LSTM networks includes at least one highway connection to compensate for the residual function of a previous LSTM network and a projection matrix configured to control the at least one highway connection, wherein the projection matrix is further configured to control a ratio between a main path and a highway connection path.

2. The apparatus of claim 1, wherein each LSTM network is further configured to:
determine by a first function block $f_t^{L+1}$=sigm $(W_{xf}^{L+1}x_t^{L+1}+W_{hf}^{L+1}h_{t-1}^{L+1}+W_{cf}^{L+1}\odot c_{t-1}^{L+1}+b_f^{L+1})$;
determine by a second function block $i_t^{L+1}$=sigm $(W_{xi}^{L+1}x_t^{L+1}+W_{hi}^{L+1}h_{t-1}^{L+1}+W_{ci}^{L+1}\odot c_{t-1}^{L+1}+b_i^{L+1})$;
determine by a third function block $j_t^{L+1}$=tanh $(W_{xc}^{L+1}x_t^{L+1}+W_{hc}^{L+1}h_{t-1}^{L+1}+b_j^{L+1})$;
determine by a fourth function block $o_t^{L+1}$=sigm $(W_{xo}^{L+1}x_t^{L+1}+W_{ho}^{L+1}h_{t-1}^{L+1}+W_{co}^{L+1}c_t^{L+1}+b_o^{L+1})$;
determine by a fifth function block $c_t^{L+1}=f_t^{L+1}\odot c_{t-1}^{L+1}+i_t^{L+1}\odot j_t^{L+1}$; and
determine by a sixth function block $h_t^{L+1}$ as a function of $c_t^{L+1}$, $o_t^{L+1}$, and one of $x_t^{L+1}$ or $$\sum_{i=1}^{N}W_{h,i}^{L+1}h_t^{L+1-i},$$

wherein $x_t^{L+1}$ is an input to the LSTM network, $h_{t-1}^{L+1}$ is an output of a previous time in the LSTM network, $c_{t-1}^{L+1}$ is a cell activation of the previous time in the LSTM network, $W_{xf}^{L+1}$, $W_{hf}^{L+1}$, $W_{cf}^{L+1}$, $W_{xi}^{L+1}$, $W_{hi}^{L+1}$, $W_{ci}^{L+1}$, $W_{xc}^{L+1}$, $W_{hc}^{L+1}$, $W_{xo}^{L+1}$, $W_{ho}^{L+1}$, and $W_{co}^{L+1}$ are weight matrices of the LSTM network, and $b_f^{L+1}$, $b_i^{L+1}$, $b_j^{L+1}$, $b_o^{L+1}$ are predetermined bias values of the LSTM network.

3. The apparatus of claim 2, wherein $f_1$ and $f_2$ are each selected from a sigmoid function (sigm) and a hyperbolic tangent function (tanh).

4. The apparatus of claim 2, wherein the sixth function block is further configured to determine $h_t^{L+1}=o_t^{L+1}\odot W_{proj}^{L+1}\tanh(c_t^{L+1})+(1-o_t^{L+1})\odot W_h^{L+1}x_t^{L+1}$.

5. The apparatus of claim 2, wherein the sixth function block is further configured to determine $$h_t^{L+1} = o_t^{L+1}\odot W_{proj}^{L+1}\tanh(c_t^{L+1}) + (1-o_t^{L+1})\odot\left(\sum_{i=1}^{N}W_{h,i}^{L+1}h_t^{L+1-i}\right).$$

6. The apparatus of claim 2, wherein the sixth function block is further configured to determine $h_t^{L+1} = o_t^{L+1} \odot (W_{proj}^{L+1} \tanh(c_t^{L+1}) + W_h^{L+1} x_t^{L+1})$.

7. The apparatus of claim 2, wherein the sixth function block is further configured to determine $$h_t^{L+1} = o_t^{L+1} \odot \left( W_{proj}^{L+1} \tanh(c_t^{L+1}) + \sum_{i=1}^{N} W_{h,i}^{L+1} h_t^{L+1-i} \right).$$

8. The apparatus of claim 2, wherein the sixth function block is further configured to determine $h_t^{L+1} = W_{proj}^{L+1} (o_t^{L+1} \odot \tanh(c_t^{L+1})) + W_h^{L+1} x_t^{L+1}$.

9. The apparatus of claim 2, wherein the $W_{h,i}^{L+1}$ are identity matrices if an input dimension of the LSTM matches an output dimension of the LSTM.

10. A method, comprising:
configuring, a plurality of long short term memory (LSTM) networks, wherein each of the plurality of LSTM networks is at a different network layer;
determining, a residual function for each of the plurality of LSTM networks;
controlling, by an output gate each of the plurality of LSTM networks, what is provided to a subsequent LSTM network;
compensating, by at least one highway connection of each of the plurality of LSTM networks, for the residual function of a previous LSTM network;
controlling, the at least one highway connection by a projection matrix, wherein the projection matrix is further configured to control a ratio between a main path and a highway connection path.

11. The method of claim 10, further comprising:
determining, by a first function block of each of the plurality of LSTM networks, $f_t^{L+1} = f_1(W_{xf}^{L+1} x_t^{L+1} + W_{hf}^{L+1} h_{t-1}^{L+1} + b_f^{L+1})$;
determining, by a second function block in each of the plurality of LSTM networks, $i_t^{L+1} = f_2(W_{xi}^{L+1} x_t^{L+1} + W_{hi}^{L+1} h_{t-1}^{L+1} + b_i^{L+1})$;
determining, by a third function block in each of the plurality of LSTM networks, $j_t^{L+1} = f_1(W_{xc}^{L+1} x_t^{L+1} + W_{hc}^{L+1} h_{t-1}^{L+1} + b_j^{L+1})$;
determining, by a fourth function block in each of the plurality of LSTM networks, $o_t^{L+1} = \tanh f_2(W_{xo}^{L+1} x_t^{L+1} + W_{ho}^{L+1} h_{t-1}^{L+1} + b_o^{L+1})$;
determining, by a fifth function block in each of the plurality of LSTM networks, $c_t^{L+1} = f_t^{L+1} \odot c_{t-1}^{L+1} + i_t^{L+1} \odot j_t^{L+1}$; and
determining, by a sixth function block in each of the plurality of LSTM networks, $h_t^{L+1}$ as a function of $c_t^{L+1}$, $o_t^{L+1}$, and one of $x_t^{L+1}$ or $$\sum_{i=1}^{N} W_{h,i}^{L+1} h_t^{L+1-i},$$

wherein $f_1$ and $f_2$ are functions, $x_t^{L+1}$ is an input to one of the plurality of LSTM networks, $h_{t-1}^{L+1}$ is an output of a previous time in the one of the plurality of LSTM networks, $c_{t-1}^{L+1}$ is a cell activation of the previous time in the one of the plurality of LSTM networks, $W_{xf}^{L+1}$, $W_{hf}^{L+1}$, $W_{xi}^{L+1}$, $W_{hi}^{L+1}$, $W_{xc}^{L+1}$, $W_{hc}^{L+1}$, $W_{xo}^{L+1}$, and $W_{ho}^{L+1}$ are weight matrices of the one of the plurality of LSTM networks, and $b_f^{L+1}$, $b_i^{L+1}$, $b_j^{L+1}$, $b_o^{L+1}$ are pre-determined bias values of the one of the plurality of LSTM networks.

12. The method of claim 11, wherein $f_1$ and $f_2$ are each selected from a sigmoid function (sigm) and a hyperbolic tangent function (tanh).

13. The method of claim 11, wherein the sixth function block is further configured to determine $h_t^{L+1} = o_t^{L+1} \odot W_{proj}^{L+1} \tanh(c_t^{L+1}) + (1 - o_t^{L+1}) \odot W_h^{L+1} x_t^{L+1}$.

14. The method of claim 11, wherein the sixth function block is further configured to determine $$h_t^{L+1} = o_t^{L+1} \odot W_{proj}^{L+1} \tanh(c_t^{L+1}) + (1 - o_t^{L+1}) \odot \left( \sum_{i=1}^{N} W_{h,i}^{L+1} h_t^{L+1-i} \right).$$

15. The method of claim 11, wherein the sixth function block is further configured to determine $h_t^{L+1} = o_t^{L+1} \odot (W_{proj}^{L+1} \tanh(c_t^{L+1}) + W_h^{L+1} x_t^{L+1})$.

16. The method of claim 11, wherein the sixth function block is further configured to determine $$h_t^{L+1} = o_t^{L+1} \odot \left( W_{proj}^{L+1} \tanh(c_t^{L+1}) + \sum_{i=1}^{N} W_{h,i}^{L+1} h_t^{L+1-i} \right).$$

17. The method of claim 11, wherein the sixth function block is further configured to determine $h_t^{L+1} = W_{proj}^{L+1} (o_t^{L+1} \odot \tanh(c_t^{L+1})) + W_h^{L+1} x_t^{L+1}$.

18. The method of claim 11, wherein $w_{h,i}^{L+1}$ are identity matrices if an input dimension of the LSTM matches an output dimension of the LSTM.

19. A method of manufacturing a residual long short term memory (LSTM) network, comprising:
forming the residual LSTM network on a wafer or a package with at least one other residual LSTM network, wherein the residual network is configured to determine by a first function block $f_t^{L+1} = \text{sigm}(W_{xf}^{L+1} x_t^{L+1} + W_{hf}^{L+1} h_{t-1}^{L+1} + W_{cf}^{L+1} \odot c_{t-1}^{L+1} + b_f^{L+1})$;
determine by a second function block $i_t^{L+1} = \text{sigm}(W_{xi}^{L+1} x_t^{L+1} + W_{hi}^{L+1} h_{t-1}^{L+1} + W_{ci}^{L+1} \odot c_{t-1}^{L+1} + b_i^{L+1})$;
determine by a third function block $j_t^{L+1} = \tanh(W_{xc}^{L+1} x_t^{L+1} + W_{hc}^{L+1} h_{t-1}^{L+1} + b_j^{L+1})$;
determine by a fourth function block $o_t^{L+1} = \text{sigm}(W_{xo}^{L+1} x_t^{L+1} + W_{ho}^{L+1} h_{t-1}^{L+1} + W_{co}^{L+1} c_t^{L+1} + b_o^{L+1})$;
determine by a fifth function block $c_t^{L+1} = f_t^{L+1} \odot c_{t-1}^{L+1} + i_t^{L+1} \odot j_t^{L+1}$; and
determine by a sixth function block $h_t^{L+1}$ as a function of $c_t^{L+1}$, $o_t^{L+1}$, and one of $x_t^{L+1}$ or $$\sum_{i=1}^{N} W_{h,i}^{L+1} h_t^{L+1-i},$$

wherein $x_t^{L+1}$ is an input to the LSTM network; $h_{t-1}^{L+1}$ is an output of a previous time in the LSTM network, $c_{t-1}^{L+1}$ is a cell activation of the previous time in the LSTM network, $W_{xf}^{L+1}$, $W_{hf}^{L+1}$, $W_{cf}^{L+1}$, $W_{xi}^{L+1}$, $W_{hi}^{L+1}$, $W_{ci}^{L+1}$, $W_{xc}^{L+1}$, $W_{hc}^{L+1}$, $W_{xo}^{L+1}$, $W_{ho}^{L+1}$, and $W_{co}^{L+1}$ are weight matrices of the LSTM network, and $b_f^{L+1}$, $b_i^{L+1}$, $b_j^{L+1}$, $b_o^{L+1}$ are pre-determined bias values of the LSTM network;
testing the hybrid recurrent network with the highway connection, wherein testing the hybrid recurrent network with the highway connection comprises testing the hybrid recurrent network with the highway connection and the at least one other hybrid recurrent network with the highway connection using one or more electrical to optical converters, one or more optical splitters that split an optical signal into two or more optical signals, and one or more optical to electrical converters.

20. A method of constructing an integrated circuit, comprising:

generating a mask layout for a set of features for a layer of the integrated circuit, wherein the mask layout includes standard cell library macros for one or more circuit features that include a residual long short term memory (LSTM) network on a wafer or a package with at least one other residual LSTM network, wherein the residual network is configured to determine by a first function block $f_t^{L+1} = \text{sigm}(W_{xf}^{L+1} x_t^{L+1} + W_{hf}^{L+1} h_{t-1}^{L+1} + W_{cf}^{L+1} \odot c_{t-1}^{L+1} + b_f^{L+1})$;

determine by a second function block $i_t^{L+1} = \text{sigm}(W_{xi}^{L+1} x_t^{L+1} + W_{hi}^{L+1} h_{t-1}^{L+1} + W_{ci}^{L+1} \odot c_{t-1}^{L+1} + b_i^{L+1})$;

determine by a third function block $j_t^{L+1} = \tanh(W_{xc}^{L+1} x_t^{L+1} + W_{hc}^{L+1} h_{t-1}^{L+1} + b_j^{L+1})$;

determine by a fourth function block $o_t^{L+1} = \text{sigm}(W_{xo}^{L+1} x_t^{L+1} + W_{ho}^{L+1} h_{t-1}^{L+1} + W_{co}^{L+1} c_t^{L+1} + b_o^{L+1})$;

determine by a fifth function block $c_t^{L+1} = f_t^{L+1} \odot c_{t-1}^{L+1} + i_t^{L+1} \odot j_t^{L+1}$; and determine by a sixth function block $h_t^{L+1}$ as a function of $c_t^{L+1}$, $o_t^{L+1}$, and one of $x_t^{L+1}$ or $$\sum_{i=1}^{N} W_{h,i}^{L+1} h_t^{L+1-i},$$

wherein $x_t^{L+1}$ is an input to the LSTM network; $h_{t-1}^{L+1}$ is an output of a previous time in the LSTM network, $c_{t-1}^{L+1}$ is a cell activation of the previous time in the LSTM network, $W_{xf}^{L+1}$, $W_{hf}^{L+1}$, $W_{cf}^{L+1}$, $W_{xi}^{L+1}$, $W_{hi}^{L+1}$, $W_{ci}^{L+1}$, $W_{xc}^{L+1}$, $W_{hc}^{L+1}$, $W_{xo}^{L+1}$, $W_{ho}^{L+1}$, and $W_{co}^{L+1}$ are weight matrices of the LSTM network, and $b_f^{L+1}$, $b_i^{L+1}$, $b_j^{L+1}$, $b_o^{L+1}$ are predetermined bias values of the LSTM network;

disregarding relative positions of the macros for compliance to layout design rules during the generation of the mask layout;

checking the relative positions of the macros for compliance to layout design rules after generating the mask layout;

upon detection of noncompliance with the layout design rules by any of the macros, modifying the mask layout by modifying each of the noncompliant macros to comply with the layout design rules;

generating a mask according to the modified mask layout with the set of features for the layer of the integrated circuit; and manufacturing the integrated circuit layer according to the mask.

* * * * *